March 20, 1951   H. W. WEST ET AL   2,546,116
SHAPE CUTTING MACHINE
Filed April 10, 1948   2 Sheets-Sheet 1
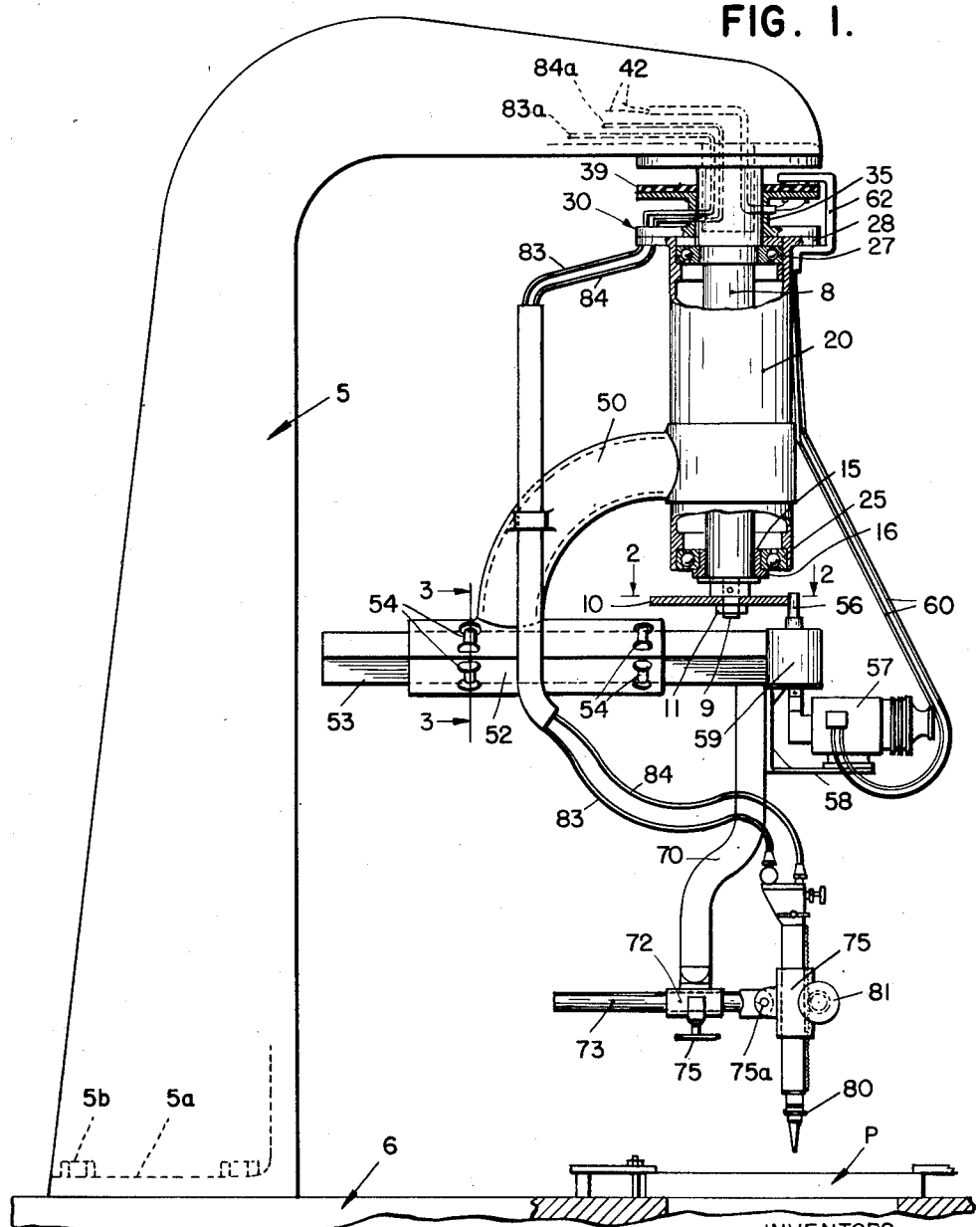
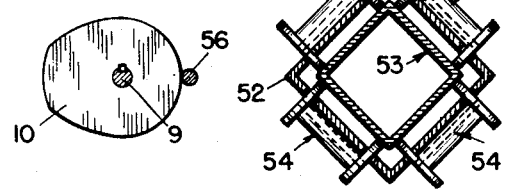
INVENTORS
HAROLD W. WEST
LLOYD R. WEST
BY
ATTORNEYS

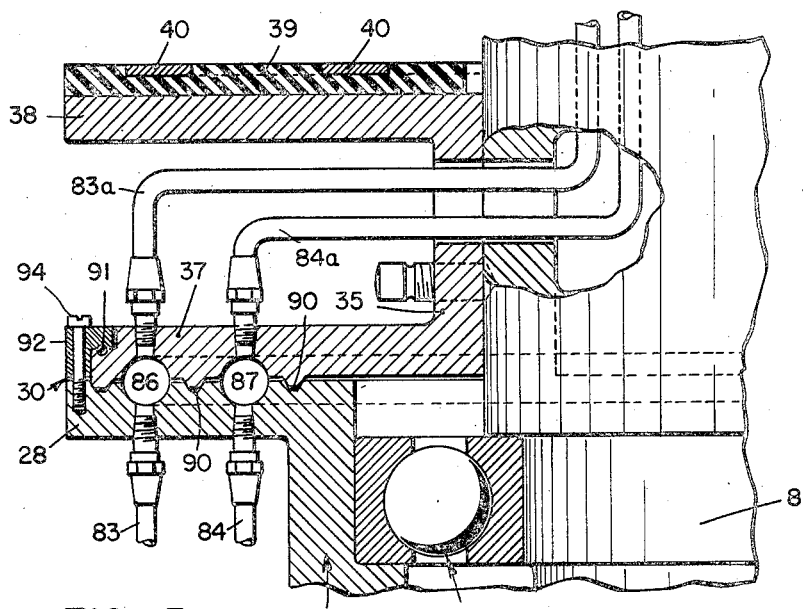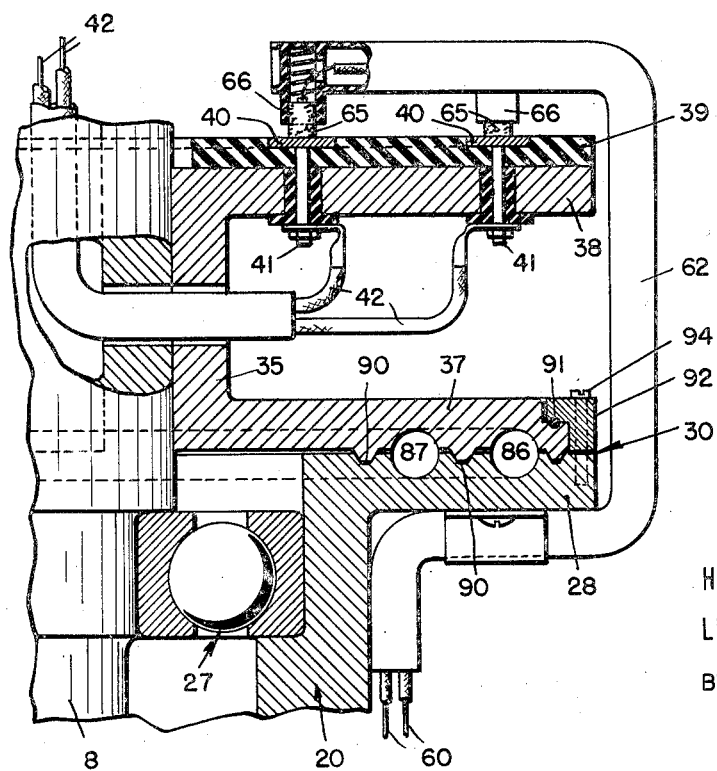

Patented Mar. 20, 1951

2,546,116

UNITED STATES PATENT OFFICE 2,546,116

SHAPE CUTTING MACHINE

Harold W. West and Lloyd R. West,
South Gate, Calif.

Application April 10, 1948, Serial No. 20,338

5 Claims. (Cl. 266—23)

This invention has to do with shape cutting machines of the type commonly known as "flame cutters."

An object of the invention is to provide a shape cutting machine by which the work piece is positioned to be cut while the cutting element—more specifically the flame nozzle—is moved relative to the work piece in response to movement of a magnetic tracer spindle around a shape-defining template or guide.

A further object is the provision of a device of this character which is simple in construction, easy to operate and especially accurate in its work.

A more particular object is to provide a shape cutter in which a cutter element and a power driven rotating tracer spindle are horizontally adjustably mounted upon a sleeve which rotates about a fixed vertical axis on a stationary mandrel supporting the shape-defining template.

Other objects and advantages of the invention will be understood from the following detailed explanation of a specific construction in which the invention is embodied, it being understood, of course, that the invention is susceptible of being carried out in other and modified specific forms of apparatus. For the purpose of the following description we shall refer to the accompanying drawings wherein:

Fig. 1 is a side elevation of our machine with some parts shown in section;

Fig. 2 is a section on line 2—2 of Fig. 1;

Fig. 3 is an enlarged section taken on line 3—3 of Fig. 1; and

Figs. 4 and 5 are enlarged fragmentary sections showing parts of the upper construction of the machine.

Referring now to the drawings, we show at 5 a support whose flanged lower end 5a is secured by bolts 5b to a work table 6 adapted to support a work piece P. A cylindrical mandrel 8 is fixed at its top end to the horizontal portion of the support 5 and depends axially therefrom, presenting a reduced diameter lower end 9 upon which a template 10 is keyed so that it remains stationary, the template being held against escape by a nut 11 threaded on the reduced lower end of the mandrel.

A collar 15 is fixed on the mandrel adjacent its lower end, the collar having a peripheral flange 16. A sleeve 20 is mounted in the following manner to rotate on the mandrel. The inner race of a ball bearing 25 is mounted on collar 15, while the outer race of the bearing is carried by the sleeve, and an upper ball bearing 27 has its inner race secured on the mandrel and its outer race secured on its sleeve. The top end of the sleeve presents an annular flange 28 which provides the lower half of a header 30.

A ring 35 is secured on the mandrel above the sleeve, the ring having spaced peripheral flanges 37, 38, the first of which provides the upper half of the header 30 and the other of which supports an insulating disc 39 carrying brush-engaging rings 40 to which are connected, by terminals 41, electrical wires 42 leading through the support to an electrical source not shown.

An arcuate arm 50 is fixed at one end, as by welding, to the periphery of the sleeve 20 and carries at its other end a horizontal guide tube 52 of angular cross-section in which a slide bar 53 of conforming cross-section is mounted to slide, roller bearing elements 54 being provided for the slide bar.

A tracing spindle 56 is driven by an electric motor 57 supported on a bracket 58, and is magnetized by an electromagnet 59 so that it attracts the metallic template 10 and follows the peripheral contour thereof as the spindle is driven by the motor. The motor is energized through wires 60 which extend through a housing tube 62, fixed to the rotatable lower half 28 of the header, and extend around and over the top of the ring 35. The housing carries spring-loaded brush elements 65, slidably mounted in guides 66 fixed to the housing tube.

An arm 70 is fixed at its upper end to the slide bar 53 and depends therefrom, carrying at its offset lower end a sleeve member 72 in which is slidably mounted a slide bar 73. The bar 73 is held adjustably positioned in the sleeve 72 by a screw 74. On the right-hand end of the latter slide bar there is pivotally mounted, at 75a, a split sleeve nozzle clamp 75. The motor-supporting bracket 58 is secured to the arm 70 and also supports the electromagnet 59.

A conventional nozzle 80, adapted to discharge an oxygen-acetylene stream, is axially slidably mounted in the clamp 75, the clamp having a hand wheel actuated screw 81 for manual adjustment. Thus the nozzle may be adjusted axially and may swing about the pivot 75a, and may be adjusted horizontally by moving the slide bar 73.

The oxygen and acetylene lines 83, 84 are connected at their discharge ends to the nozzle and are connected at their inlet ends to the rotatable lower half 28 of the header 30. Annular channels 86, 87 are provided, half in the rotatable header portion 28 and half in the stationary header portion 37, and supply lines 83a, 84a lead into the respective channels from sources not shown. Since the channels 86, 87 must be leakproof, suitable gaskets 90, a sealing ring 91 and ring retainer 92 are provided, the retainer 92 being secured to the lower half of the header by a screw 94.

From the foregoing it will be observed that the movable parts of the machine are all suspended from the sleeve 20 and that the nozzle is moved in its cutting path relative to the work piece P in response to rotation of the tracing spindle 56 in magnetic engagement with the template. As the spindle follows around the high and low portions of the peripheral surface of the template, the slide bar 53 moves axially in a plane normal to the axis of the mandrel, the nozzle being also thereby so moved.

We claim:

1. A shape cutting machine comprising a support, a mandrel fixedly carried by and depending axially from the support, a header carried by and coaxial with the mandrel, said header comprising a plate fixed on the mandrel and a companion plate rotatably mounted on the mandrel, mating grooves in the opposite faces of the plates defining an annular fuel chamber, a fuel supply line communicating through said fixed plate with said channel, a sleeve rotatably mounted on the mandrel, means on the mandrel for retaining a template, a power driven rotatable tracer member, a fuel nozzle, means mounting the tracer member and nozzle on the sleeve for movement therewith and for movement relative to the sleeve in a plane normal to the longitudinal axis thereof, and a fuel delivery line communicating with the nozzle and with the fuel channel through said rotatably mounted plate.

2. A shape cutting machine comprising a support, a mandrel fixedly carried by and depending axially from the support, a template retainer on the mandrel, a rotatable tracer member, an electric motor for driving the tracer member, a fuel nozzle, support means rotatably mounted on the mandrel to support the tracer member, motor and nozzle for movement relative thereto in a plane normal to the axis of the mandrel, and means for supplying fuel to the nozzle and electricity to the motor, comprising a brush ring fixedly carried by the mandrel, a brush carried by the support means and having electrical connection with the rings and with the motor, a pair of companion header plates having a fuel channel in their opposed faces, one of the plates being fixed to the mandrel and the other of the plates being mounted to rotate on the mandrel, fuel communicating means communicating through the latter plate from the channel to the nozzle, fuel support means communicating through the fixed plate with the channel, and means conductively connecting the ring with an electrical source.

3. A shape cutting machine comprising a support, a mandrel fixed at its inner end to the support, a sleeve mounted on the mandrel to rotate about the axis thereof, means on the outer end of the mandrel to retain a template, an arm fixed at its inner end to the sleeve, said arm projecting laterally and downwardly from the sleeve and terminating below the plane of the outer end of the mandrel, a tubular guide member fixed on the outer end of the arm and disposed in a plane below and normal to the axis of the mandrel, a slide bar mounted for axial sliding movement in the guide member, roller means carried by the guide member and engaging the slide bar, a cutting torch carried by and depending below the slide bar, and a tracer spindle carried by the slide bar normally coaxial with the cutter in position to engage the perimeter of a template carried by the mandrel.

4. A shape cutting machine comprising an inverted L-shaped support having adjacent its free end a fixed depending mandrel, means for mounting a template on the outer end of the mandrel in a plane normal to the axis of the mandrel, a sleeve mounted on the mandrel to rotate about the axis thereof, an arm fixed on the sleeve, the arm projecting laterally and downwardly from the sleeve and terminating at a point spaced sufficiently laterally from the axis of the mandrel to permit the outer end of the arm to rotate 360° around a template carried by the mandrel, a slide bar, means on the outer end of the arm axially slidably retaining the slide bar in a plane normal to the axis of and spaced below the outer end of the mandrel whereby the slide bar may reciprocate in a plane below and parallel with the template, a driven tracer spindle mounted on the outer end of the slide bar for rotation about an axis parallel with the axis of the mandrel, a second arm depending from the slide bar, and a cutting torch carried by the second arm in a plane normal to the axis of the tracer spindle.

5. A shape cutting machine comprising: a work holding base, a mandrel-support above the base, a mandrel fixed at its top end to said support and depending therefrom perpendicular to the base, said mandrel terminating above the base, a sleeve rotatably mounted on the mandrel, means on the bottom end of the mandrel for retaining a template, an arm fixed to the sleeve, extending downwardly and outwardly therefrom and terminating below the plane of the bottom end of the mandrel, a bar axially slidably carried by the outer end portion of said arm, a tracer spindle carried by the outer end portion of said bar, and a cutting torch carried by and depending from said bar.

HAROLD W. WEST.
LLOYD R. WEST.

REFERENCES CITED

The following references are of record in the file of this patent:

UNITED STATES PATENTS

| Number | Name | Date |
|---|---|---|
| 1,365,021 | Bucknam | Jan. 11, 1921 |
| 1,582,033 | Godfrey | Apr. 27, 1926 |
| 1,748,870 | Eberle | Feb. 25, 1930 |
| 2,017,475 | Schmidt | Oct. 15, 1935 |
| 2,040,914 | Anderson | May 19, 1936 |
| 2,388,376 | Young | Nov. 6, 1945 |
| 2,468,938 | McLauchlan | May 3, 1949 |

FOREIGN PATENTS

| Number | Country | Date |
|---|---|---|
| 417,236 | Germany | Aug. 8, 1925 |
| 438,940 | Great Britain | Nov. 26, 1935 |